July 17, 1934.  W. McNEIL  1,966,990
VEHICLE SUSPENSION SPRING REBOUND CHECK
Filed Oct. 17, 1932   3 Sheets-Sheet 1
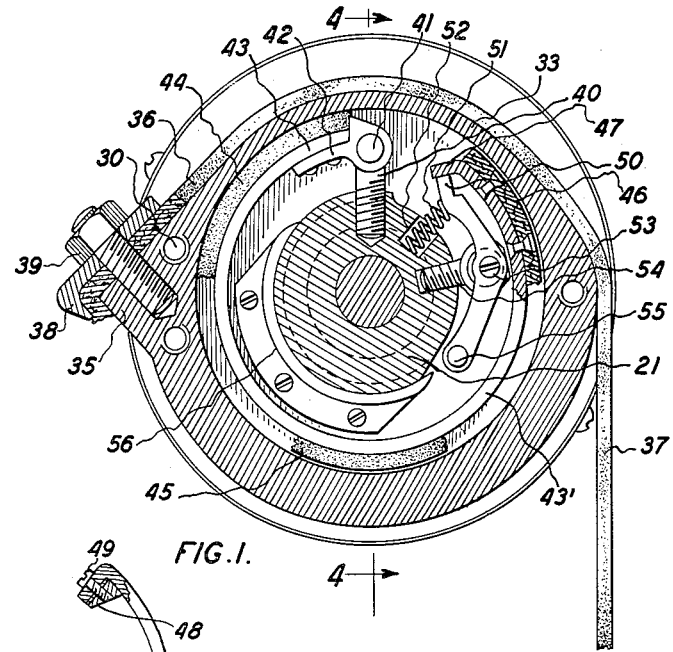
FIG.1.
FIG.1A.
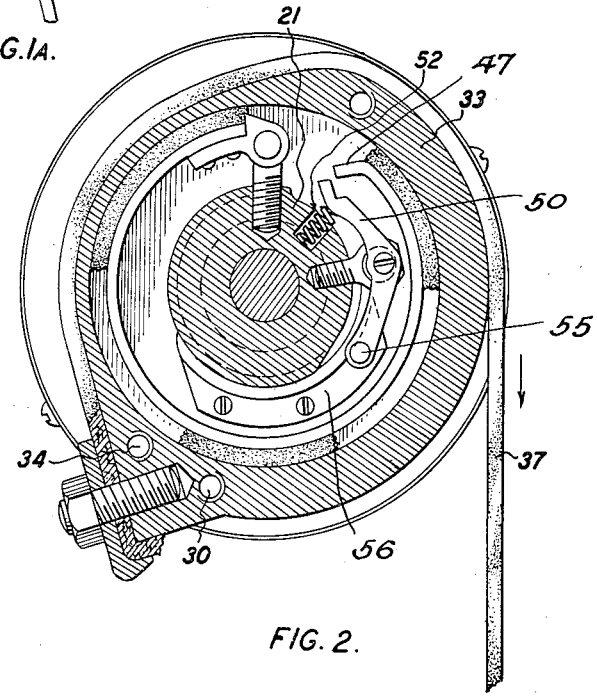
FIG. 2.
W. McNeil
INVENTOR
By Marks & Clerk
Attys.

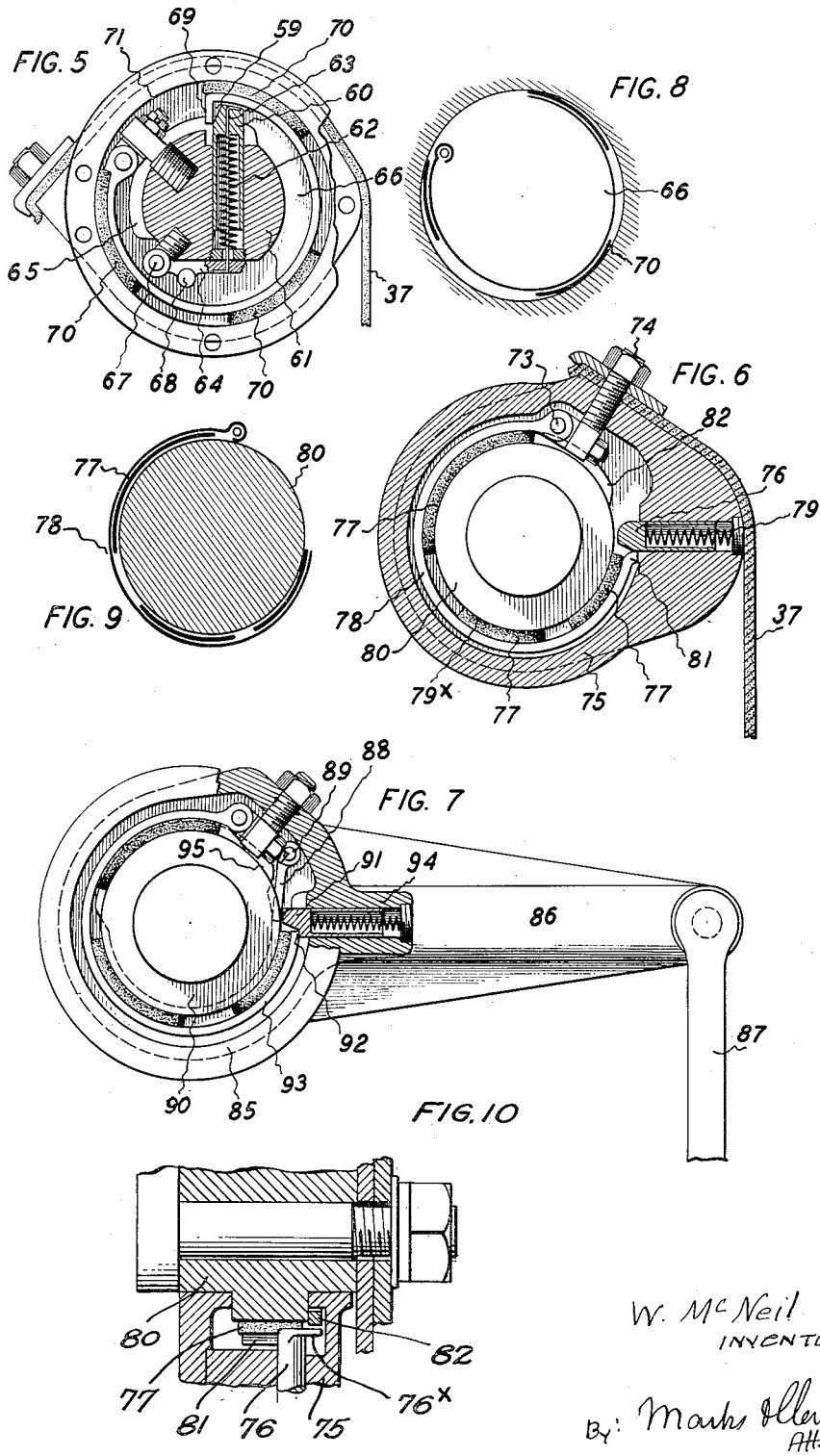

UNITED STATES PATENT OFFICE 1,966,990

VEHICLE SUSPENSION SPRING REBOUND CHECK

William McNeil, Sydney, New South Wales, Australia

Application October 17, 1932, Serial No. 638,244
In Australia November 6, 1931

8 Claims. (Cl. 267—10)

This invention relates to vehicle suspension spring rebound checks of the friction type in which a C-spring free at one end and attached at the other end to a control member, coacts with a drum. In some known devices of this type the C-spring operates against a path on the interior peripheral surface of a drum, and in others it operates upon an external path upon the periphery of a drum or hub. In some of these known devices, the C-spring is the fixed element and the drum is the moving (revolving) element, but in others of them the reverse arrangement is used. The fixed element is usually attached to the chassis frame of the vehicle, and the moving (revolving) element is connected to the axle or to the suspension spring by means of a flexible strap or by a lever and link. All these known devices are "one way" dampers, that is to say, the check action takes place during the suspension spring rebound movement only, and the compression movement of the suspension spring is not checked.

In these known devices the C-spring or the C-spring plus its cleading, is in the one type curved on a slightly larger diameter than the drum interior diameter and it is sprung into the drum, and in the other case it is curved on a slightly smaller diameter than the drum or hub exterior against which it is to act, and is sprung over the drum or hub. The C-spring permits the revoluble element which is connected to the suspension spring to move with negligible resistance during the compression flexure of the suspension spring, but imposes considerable resistance to its movement during the rebound flexure of the suspension spring.

In arrangement in which the C-spring frictionally engages the interior peripheral surface of a drum, it contracts in diameter responsively to compression flexure of the suspension spring and draws inward from the drum wall to permit the revolving element to turn with negligible resistance; but when the suspension spring flexes in the rebound direction the C-spring is "crowded" and is thereby caused to distend and bear frictionally against the drum wall, and resistance to movement of the revoluble element is thus produced.

In arrangements of the same kind in which the C-spring frictionally engages the exterior peripheral surface of a drum, it expands, and so moves away from the drum surface during the compression flexure of the suspension spring; and it is caused to contract upon the drum surface and embrace it frictionally during rebound flexure of the suspension spring, and thereby impose resistance to movement of the revoluble element.

The resistance so imposed on the movement of the suspension spring is in either case "progressive" throughout the full range of its rebound oscillation, and is more or less energetic in proportion to the time period and energy of the spring rebound movement. In slow and light oscillations, moderate damping effect is displayed, but as the speed and range of the oscillations increase, a correspondingly more energetic damping effect is obtained.

The action of these known devices is, however, faulty or imperfect from a utility point of view, because the damping effect comes into operation immediately rebound oscillation of the suspension spring commences, whether that rebound action be great or small.

Ideal riding conditions, however, require that oscillating flexure of vehicle suspension springs shall be undamped during a certain limited range above and below the neutral position of the suspension spring, so that the easy, slow, small range suspension spring oscillations which take place when a vehicle is running over a good road surface shall not be constrained, but that damping of the spring rebound oscillations shall commence immediately that desirable range of unconstrained flexure is exceeded, and that the damping will be maintained and exerted with sufficient effect to restrain the rebound movement and suppress it before it attains an undesirable amplitude.

I have found that when the C-spring is cleaded, over its whole length or substantially so, with a frictional material of a hard and not very pliable nature (as has been the practice heretofore), the natural flexibility of the C-spring is impaired so that its facility for "crowding" against or for grasping upon the drum surface with which it coacts during damping action is imperfect, and in like manner its facility to contract during the compression flexure of the suspension spring is imperfect. When, however, the continuity of cleading is broken by a series of deep transverse cuts, or by dividing it into sections so that in effect it becomes a number of separate shoes spaced apart, the functioning of the C-spring is not so impaired.

I have further found that it is necessary that a control means operating automatically should be provided for holding the C-spring free of frictional engagement with the coacting drum surface during a certain range of oscillation of the suspension spring and for bringing it into engagement with the coacting drum surface when the suspension spring oscillation exceeds the predetermined desired free range.

The device in which the present invention consists is characterized chiefly in that it includes means whereby suspension spring rebound checks of the type above referred to are automatically held inoperative through any desired range of suspension spring oscillation, and are caused to become automatically operative and to remain operative throughout the whole range of suspension spring rebound movement in excess of the desired free range. It is further characterized in that this automatic control feature is adjustable. This adjustment permits the device to be set (1) so that it will come into action to check only those rebound movements of the suspension spring which are in excess of the range of desired free oscillation of the spring; or (2) come into action to check all rebound movements irrespective of their range; or (3) to remain out of action throughout the full range of rebound movements.

In the accompanying drawings:—

Fig. 1 is a vertical section through the preferred form of the device on the plane 1—1, Fig. 4, as it appears whilst the C-spring is automatically latched in a contracted position out of frictional contact with the drum wall by a cam operated trip pawl, thereby leaving the suspension spring free to oscillate in both directions through a desired range, without damping;

Fig. 1A is a fragmentary detail suggestive of the fitting of an adjusting piece on the free end of the C-spring;

Fig. 2 is a vertical section through the device as it appears in action whilst the cleaded C-spring is in frictional engagement with the drum wall interior face, imposing damping resistance to rebound flexure of the suspension spring;

Fig. 5 is a section similar to Figs. 1 and 2, illustrating the same device with an alternative form of trip for controlling the range of frictional contact of the cleaded C-spring with the drum wall; and Figs. 6 and 7 are sections illustrating the device in that form of it in which the C-spring embraces the external face of a drum.

Figure 3:
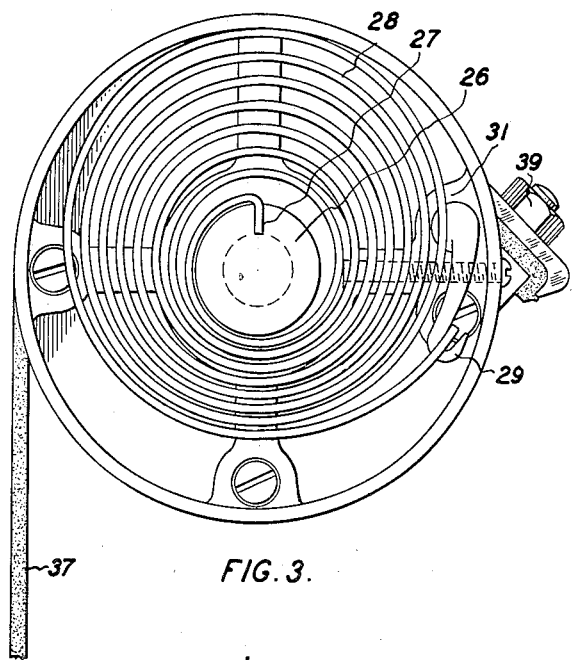
Fig. 3 is an elevational view through the spring box on the back of the damper drum, with spiral spring therein by which the movable element (the drum) which is connected to the suspension spring is revolved reversely during the suspension spring compression flexure, when tension on the strap or link by which it is connected to the axle or to the suspension spring slackens.
Figure 4:
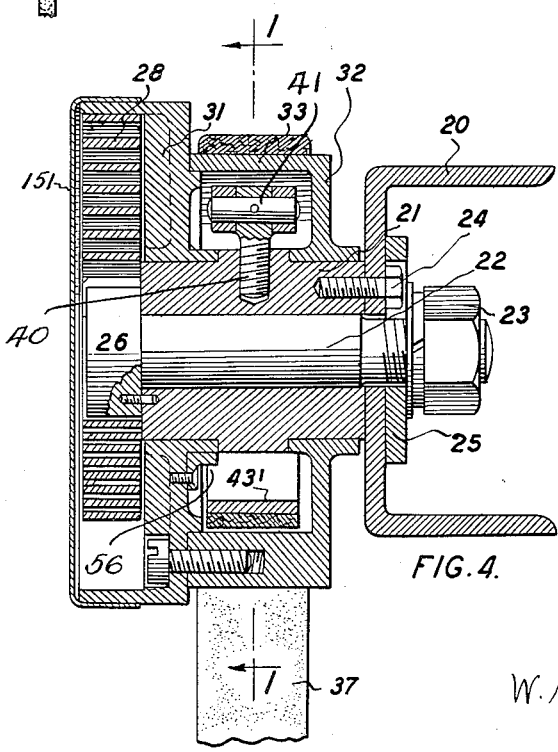
Fig. 4 is a transverse section on the plane 4—4, Fig. 1.

In Figs. 1 to 5 the C-spring is the fixed element and the drum is the moving (revoluble) element, and the C-spring is caused to engage frictionally with the interior peripheral surface of the drum wall to exert resistance to rebound movement when it is crowded outwards against the drum wall. In Figs. 6 and 7 the arrangement is reversed; the C-spring is in this case the moving (revoluble) element, and the drum is the fixed element, and the C-spring exerts its resistance to oppose the suspension spring rebound oscillations when it is contracted to embrace the external surface of the drum.

Fig. 8 is a diagrammatic section showing the elliptic shape that the cleaded C-spring assumes at rest when it is sprung into the drum of Figs. 1 to 5. The damping resistance exerted by the device is progressive, proportionate to the amount that the C-spring is "crowded" out of this elliptic shape into conformity with the circular shape of the drum wall during the rebound movement, the crowding action corresponding with the rapidity and energy of the rebound movement of the suspension spring.

Fig. 9 is a diagrammatic section explanatory of the relationship of the C-spring and its cleading to the drum in Figs. 6 and 7 during the desired range of free oscillation, whilst the C-spring is locked in a slightly expanded condition.

Fig. 10 is a fragmentary sectional plan view illustrating the means for releasing the plunger shown in Fig. 6.

The most desirable method of fitting the device to an automobile is shown in Figs. 1 to 5. In Figs. 1 to 4, 20 is a frame longitudinal of a car having the hub member 21 sleeved over a bolt 22 secured to it by a nut 23 and checked against rotation by one or more check pins 24, 25 being a washer. The head 26 of the bolt 22 is notched to carry the inbent tail 27 of a spiral spring 28. The tail eye of this spring is held on a hook 29, the offset socket on the hook stem being set in a hole 30 drilled in the side wall 31 of the drum and the lug 35 (see Fig. 1). 32 is the inner side wall of the drum and 33 its peripheral wall. The drum cover 151 is fixed to the drum body by machine screws. The interior face of the peripheral wall of the drum body is machined cylindrically. Its exterior face as shown in the drawings is thickened over about half the perimeter of the drum. An enlargement lug 35 on the outer side of the drum wall 33 carries the butt end 36 of a flexible strap 37 by which the drum is connected to the suspension spring near its attachment to the axle, or is connected directly to the axle of the vehicle. 38 is a clamp plate held down by a nut 39 on the butt 36 of the strap 37 to secure it to the drum.

The spring 28 functions to turn the drum in the negative direction when tension on the bridle strap or link 37 releases during the compression flexure of the suspension spring. The rebound movement of the suspension spring communicated through the strap 37 turns the drum in the positive direction, indicated by an arrow in Fig. 2. 40 is a stud eye projecting radially into the hub 21 centrally of the interior chamber within the drum peripheral wall 33. A wrist pin 41 carried in the eye of this stud passes through the eyes of a lug 42 which is riveted to the butt end 43 of the C-spring 43'. The C-spring is shod with several pads of frictional material 44, 45, 46, spaced more or less apart. The tail end of the C-spring is inbent as shown at 47. Alternatively, the tail of the C-spring may be inbent squarely to form a knuckle as shown in Fig. 1A, in which case a shoe piece 48 is fixed inside the knuckle by a screw pin 49. The shoe piece 48 is sized and shaped to coact with the pawl which is hereinafter described. When the simplest arrangement, shown in Fig. 1, is used, in which the tail of the C-spring is inbent at an obtuse angle and is not fitted with a shoe, this inbent end is also shaped and proportioned to coact with the same pawl.

The C-spring is curved to approximately circular shape and the faces of its shoes 44, 45, 46 are presented outwardly to face the interior peripheral wall 33 of the drum. The clearances between the shoes and the drum wall shown in Fig. 1, which occur when the drum is being unwound and the strap 37 is slack, are exaggerated to facilitate explanation. In practice, the shoes 44, 45, 46 always contact in some degree with the drum wall 33. The toe piece of a rocking pawl 50 coacts with the knuckle 47 or with the knuckle shoe piece 48 and is normally pushed out to engage it by a spring 51 which is housed in a pocket 52 drilled radially in the hub 21. The pawl is pivoted at 53 in the eye of a stud 54 which is screwed radially into the hub 21. The tail of the pawl is provided with an offset tappet 55, and a quadrant cam 56 is pinned to the inner side wall of the drum and is positioned relatively to the offset tappet member 55 to procure the desired operation of the pawl, in the manner hereinafter described.
In Fig. 2 the parts appear as when the strap 37 is in tension and the C-spring shoes are in frictional contact with the interior peripheral wall of the drum. This is the position when the device is operating to damp spring rebound. The cam 56 is then in engagement with the tappet 55 and the pawl 50 is thus retired, so that its toe piece is moved clear of the knuckle 47. So long as the cam 56 is acting behind the tappet 55 on the pawl 50, tilting its engaging end inward and leaving the C-spring free to distend, the device is free to resist rebound movements, for in those circumstances positive rotation of the drum obediently to the tensioning on the strap 37 in the direction of the arrow results in "crowding" of the C-spring towards its pivoted butt, whereby it is caused to distend and the cleading shoes on it are, therefore, caused to bear frictionally against the interior peripheral wall of the drum. When tension on the strap 37 slackens, which happens during compression flexure of the vehicle suspension spring, the C-spring is to some extent flexed reversely, by reason of frictional drag on its cleading shoes by the drum wall. The knuckle end of the spring is thus moved in the negative direction, contracting the girth of the spring, and the pawl 50 thereupon engages behind the spring tail 47 as seen in Fig. 1; whilst so engaged the pawl holds the C-spring contracted and frictional contact between the C-spring cleading shoes and the drum peripheral wall is then so small that it is practically negligible. As soon, however, as the pawl is released by the tripping action of the cam 56, the C-spring is released and it distends, and its shoes frictionally engage the peripheral wall of the drum whilst the drum is revolving in the right hand (operative) direction, consequent on the tensioning of the strap 37 in the rebound movement of the vehicle suspension spring. The frictional load thus imposed on the drum to retard its movement operates through the strap to damp the spring rebound.

By appropriately designing the cam 56, and adjusting its position, the release point at which the pawl will liberate the C-spring for engagement of its shoes with the drum wall may be varied. A like adjustment of the point of commencement of frictional engagement of the C-spring with the drum wall is obtainable by varying the length of the strap 37; alteration in the strap length brings the leading end of the cam into engagement with the tappet 55 either sooner or later, as the case may be, in the range of the suspension spring's oscillation. The device can, therefore, be held inoperative during any predetermined range of oscillation of the suspension spring, and can be brought into action immediately this range of oscillation is exceeded, and will remain in action thereafter until the direction of the suspension spring oscillation reverses.
It needs to be emphasized that the C-spring must be constructed of tempered spring steel and that its flexibility is impaired so that its operation is only partially satisfactory if its external surface is cleaded over the whole length of it with a material of restricted pliability unless that cleading is intersected with deep transverse cuts which, in effect, divide it into several shoe lengths.

The clearance between the spring knuckle and the pawl is neatly adjusted, so that the pawl, when it is engaged behind the knuckle, will hold the spring just sufficiently contracted to permit the shoes to touch the drum wall with negligible friction.

The thickening of the drum wall over an arc of it is optional. This thickening provides a means for giving greater leverage for the strap to operate with during the first portion of the suspension spring rebound than during the latter portion of the rebound, and it also provides means for introducing greater resistance to suspension spring rebound movements after they have exceeded a certain predetermined range.

In the modification shown in Fig. 5 the hub 61 is fixed to the frame of the vehicle in any convenient manner. In this design the pawl is a tubular plunger 60 housed for endwise movement in a hole drilled through the hub 61, 62 is a helical spring which urges this plunger 60 outward, 63 a wire bridle which connects the plunger to a tappet 64, 65 is the cam which is fixed to the drum wall 66, 67 is the tappet fulcrum pin fixed in the hub 61, and 68 an offset lug on the side of the tappet in the path of movement of the cam 65. The toe of the pawl 60 is sloped as shown at 59 so that the C-spring tail engages it wedgewise. The wedgewise engagement provides the necessary accommodation for compensation for wear on the cleading material in protracted use. During movement of the drum 66 in the negative direction as the strap 37 slackens, the spring knuckle 69 moves to the left and the pawl 60 is pushed out by the spring 62 and engages behind the spring knuckle 69 and so holds the C-spring in retracted position with its shoes 70 making only touch contact with the drum wall. When, in the course of positive rotation of the drum 66, the cam 65 reaches the tappet 64, outward movement of the tappet retracts the pawl 60 and releases the C-spring, and then as a result of the crowding action on the C-spring, its shoes 70 are caused to bear on the drum wall 71 with a degree of friction which varies responsively to the rate and energy of the drum's positive rotative movement.

It will be obvious that substantially the same arrangement can be adopted when the C-spring is carried by the drum and embraces the hub. Figs. 6, 7, and 9 are explanatory of structural adaptations of the same elements for such an arrangement. In the arrangement in which the C-spring is held by the hub (Figs. 1 to 5) the shoes are fixed on the exterior face of the C-spring and they frictionally engage the interior face of the revoluble drum, and frictional engagement of the shoes is effected by the "crowding" effect on the C-spring which causes it to distend in girth. In the alternative arrangements, Figs. 6, 7 and 9, frictional engagement of the C-spring shoes with the exterior surface of a drum or hub is effected by drag of the C-spring which causes it to contract its girth and tend to embrace the hub.

In Fig. 6 the eye 73 of the C-spring is carried by an eye bolt 74 which is fixed in the external drum wall; this bolt serves also for securing the end of the bridle strap 37 to the drum 75. The plunger pawl 76 is housed in the drum wall. The cleading shoes 77 are in this case fixed on the interior face of the C-spring 78, and they frictionally engage the periphery 79ˣ of the fixed drum or hub 80.

The head of the pawl 76 is sloped for wedgewise engagement with the free knuckle end 81 of the C-spring 78 and in the release movement the pawl is normally constrained by the pawl spring 79 to move inwardly and check against the knuckle end 81 of the C-spring. When the bridle strap 37 tensions in the drag movement of the C-spring, which occurs when the suspension spring rebounds, the C-spring is caused to embrace the surface 79ˣ of the drum or hub 80, gripping the shoes 77 upon it with a degree of pressure which augments rapidly with the speed and range of the rebound movement.

In the reverse rotation of the drum 75 which takes place when tension on the bridle strap 37 is relaxed during compression flexure of the vehicle suspension spring, the frictional embrace of the C-spring shoes 77 releases the hub 80 as shown in Fig. 9, the C-spring 78 becoming distended, and the pawl 76 draws clear of the knuckle 81, permitting the pawl 76 to be moved inward by the spring 79 to lock the C-spring 78 in its distended position, and remain inoperative for damping purposes until a compression flexure of the suspension spring is so great that a lug 76ˣ on the head of the pawl 76 runs over the cam 82, and this cam pushes the pawl 76 back into its housing and thus releases the C-spring 78, permitting it to again embrace its shoes 77 on the hub 80. In the positive rotation of the drum which takes place when the vehicle suspension spring rebounds, the C-spring 78 is trailed over the hub surface 79 and grips it frictionally, thus braking the rotation of the drum 75 and so tensioning the strap 37 and damping the suspension spring rebound.

Fig. 7 does not differ substantially from Fig. 6. The drum 85 is provided with an integral arm 86, and a bridle link 87 is connected to the end of this arm. A tongue 88 is hung on a pivot 89 on the drum wall, with its free end trailing tangentially over the surface of the hub 90 in the path of the cam 95. The pawl 91 is checked at its shoulder 92 to engage against the outer face of the tail of the C-spring 93; the end of the pawl 91 is thus prevented from contacting with the surface of the hub 90. When the outside drum moves in the reverse direction in response to the compression flexure of the suspension spring, the C-spring is distended and the pawl 91 locks it in that distended position in exactly the same manner as described above in relation to Fig. 6, giving free oscillation within the desired range.

A cam 95 fixed to the drum 90 comes behind the tongue 88 if the drum continues to be revolved reversely in response to excessive compression flexure of the suspension spring, and forcing the tongue 88 outward, pushes the pawl 91 back into its housing 94 and thus provides clearance for the C-spring to contract on the hub so that when the drum is revolved in the acting direction responsively to rebound flexure of the suspension spring, the C-spring 93 will embrace the hub 90 frictionally and effect damping of the suspension spring rebound.

In all the arrangements, the position at which the damping action commences can be varied by varying the relative position of the cam to the pawl, and this can be done either by altering the position of the cam on the drum, or shortening or lengthening the bridle strap or link; also, in all of them, the damping action ceases at the termination of each dampened rebound movement immediately the bridle strap or link slackens.

To ensure quite satisfactory functioning of these suspension spring dampers, correct fitting of the interacting parts is essential. The C-spring is bent to a true circle; when it is shod, its diameter outside the cleading is slightly greater than the interior diameter of the drum, so that it must be sprung into the drum in the case of the construction in which the spring distends outwardly. In this in-springing the true circular shape of the C-spring is distorted slightly towards an elliptical shape, with the result that the cleading touches the drum wall at certain spots only, thus the frictional engagement of the cleading with the drum wall is relatively negligible.

A very slight contraction of the C-spring (or a distention of it in the Figs. 6 and 7 alternative arrangements) results in release of frictional engagement of the C-spring with the drum, and the spiral resetting spring (or alternative link connection) can then revolve the drum reversely with ease to its full back position. Immediately operative rotation of the drum takes place upon the bridle strap or link coming into tension, the crowding (or clinging) effect causes the C-spring to crowd more or less tightly against the interior drum face, or in the case of the Figs. 6 and 7 arrangement to contract upon and cling to the exterior drum face; and in either case to remain in frictional engagement until the suspension spring rebound movement ends. The degree of damping effect augments automatically in proportion to the rapidity and energy of the rebound movement; there is no period of lost motion, and damping is progressive and continuous from its commencement until the rebound motion is fully arrested; and, as already described, the commencement position of the damping action is variable.

The length of movement between the coacting frictional surfaces (Figs. 1 to 6) is approximately equal to the range of rebound movement in the road spring; rebound is, therefore, checked gradually and without sudden, irregular, or jagging resistance which might occur if the range of the frictional contact were relatively short.

What I claim as my invention and desire to secure by Letters Patent is:—

1. In a suspension spring rebound damper of the kind herein described, a brake drum, a tempered steel C-spring fixed at one end and free at the other end, friction shoes on said C-spring adapted to co-act with the peripheral surface of the drum, means for automatically latching the free end of the C-spring to prevent braking engagement of its shoes with the co-acting drum surface, and means for automatically releasing said C-spring at any predetermined point in the range of the compression flexure of the suspension spring so that the C-spring can expand and frictionally engage the drum surface to brake the rebound movement of the suspension spring only when the compression flexure of the suspension spring exceeds a predetermined free range.

2. In a suspension spring rebound damper of the kind herein described, a brake drum, a tempered steel C-steel fixed at one end and free at the other end, friction shoes on said C-spring adapted to co-act with the peripheral surface of said drum, a spring operated pawl engageable with the free end of the C-spring to prevent braking engagement of the spring shoes with the co-acting drum surface, and a cam for releasing said pawl from engagement with said C-spring at any predetermined point in the range of the compression flexure of the suspension spring thereby permitting the C-spring to expand and brake the rebound movement of the suspension spring only when the compression flexure of the suspension spring exceeds a predetermined free range.

3. In a suspension spring rebound damper of the kind herein described, a brake drum revoluble responsively to the suspension spring oscillations, a fixed hub, a tempered steel C-spring fixed at one end to said hub and free at the other end, friction shoes on said C-spring adapted to co-act with the peripheral surface of said drum, a housing in said hub, a spring plunger slidable in said housing, said plunger engageable with the free end of the C-spring to prevent braking engagement of the spring shoes with the co-acting drum surface, a tappet, a cam fixed on the drum and acting on said plunger through said tappet to retire the plunger from engagement with the C-spring at any predetermined point in the reversing movement of the drum during the compression flexure of the suspension spring, thereby permitting the C-spring to expand and brake the rebound movement of the suspension spring only when the compression flexure of the suspension spring exceeds a predetermined free range.

4. A suspension spring rebound damper as claimed in claim 1, wherein the face of the free end of the C-spring is disposed at an obtuse angle.

5. A suspension spring rebound damper according to claim 1, wherein the friction shoes are spaced apart.

6. A suspension spring rebound damper according to claim 1, wherein the friction shoes are separated into sections by cross cuts.

7. In a suspension spring rebound damper of the kind herein described, a brake drum revoluble responsively to the suspension spring oscillations, a fixed hub, a tempered steel C-spring fixed at one end to said drum and free at the other end, friction shoes on said C-spring adapted to coact with the peripheral surface of said hub, a radially disposed housing in said drum, a spring actuated plunger slidable in said housing, said plunger engageable with the free end of the C-spring to prevent braking engagement of the spring shoes with the coacting hub-surface, a cam fixed on the hub and acting on said plunger to retire the plunger from engagement with the C-spring at any predetermined point in the reversing movement of the drum during the compression flexure of the suspension spring thereby permitting the C-spring to contract and brake the rebound movement of the suspension spring only when the compression flexure of the suspension spring exceeds a predetermined free range.

8. In a suspension spring rebound damper of the kind herein described, a brake drum revoluble responsively to the suspension spring oscillations, a fixed hub, a tempered steel C-spring fixed at one end of said drum and free at the other end, friction shoes on said C-spring adapted to coact with the peripheral surface of said hub, a radially disposed housing in said drum, a spring actuated plunger slidable in said housing, said plunger engageable with the free end of the C-spring to prevent braking engagement of the spring shoes with the coacting hub-surface, a tongue pivotally carried on said drum and disposed under the end of said plunger, a cam fixed on the hub and acting on said plunger through said tongue to retire the plunger from engagement with the C-spring at any predetermined point in the reversing movement of the drum during the compression flexure of the suspension spring thereby permitting the C-spring to contract and brake the rebound movement of the suspension spring only when the compression flexure of the suspension spring exceeds a predetermined free range.

WILLIAM McNEIL.